J. S. DOYLE.
ELECTROPNEUMATIC BRAKE.
APPLICATION FILED OCT. 24, 1914.
1,175,053.
Patented Mar. 14, 1916.
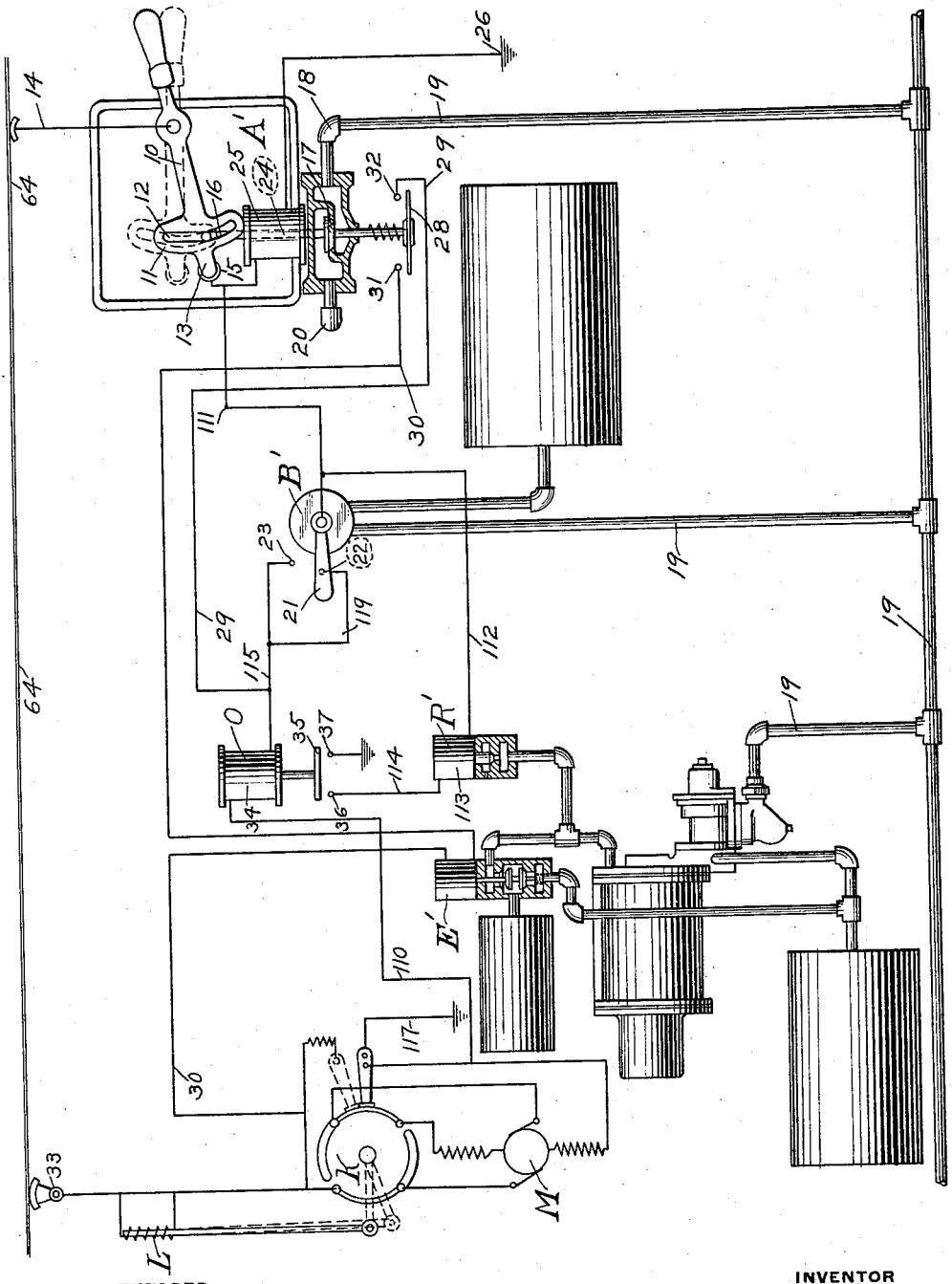
WITNESSES
Henry W. Crowell.
G. M. Clements.
INVENTOR
James S. Doyle
by Wm. M. Cady
Att'y.

UNITED STATES PATENT OFFICE.

JAMES S. DOYLE, OF MOUNT VERNON, NEW YORK, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,175,053.  Specification of Letters Patent.  Patented Mar. 14, 1916.

Original application filed April 23, 1910, Serial No. 557,186. Divided and this application filed October 24, 1914. Serial No. 868,447.

*To all whom it may concern:*

Be it known that I, JAMES S. DOYLE, a citizen of the United States, residing at Mount Vernon, in the county of Westchester and State of New York, have invented new and useful Improvements in Electropneumatic Brakes, of which the following is a specification.

This invention relates to electro-pneumatic brakes for railway cars and is a division of application Serial No. 557,186, filed April 23, 1910.

One object of the invention is to provide an improved electro-pneumatic brake.

Another object of the invention is to provide improved means for effecting an application of the brakes upon failure of line current, by utilizing current supplied by the car motor running as a generator.

Other objects and advantages will appear in the following more detailed description of the invention.

The single figure of the accompanying drawing is a diagrammatic view of an electro-pneumatic brake equipment for a car, with my improvements applied thereto.

According to the construction shown in the drawing, the usual automatic pneumatic brake apparatus may be employed, which is adapted to be operated in the usual manner by varying the pressure in the brake pipe 19 upon manipulation of the brake valve B'. For controlling the brakes electrically, a release magnet valve device R' is provided having a magnet coil 113, and an emergency magnet valve device E' for effecting an electric emergency application of the brakes. The circuit of the release magnet valve device R' is controlled by a switch 35 adapted to be actuated by a magnet device O having a magnet coil 34 the circuit of which is controlled by manipulation of the brake valve B'. The normal current supply for the electro-pneumatic brake controlling device R' is also controlled by a master switch A' and when the line current is cut off for any reason, the car motor M is arranged to be converted into a generator by the automatic action of a reversing switch K so as to supply current for effecting an electro-pneumatic application of the brakes.

The master switch A' comprises a pivoted arm 10 having a head 11 peculiarly slotted as at 12, and also having a contact 13. The lever 10 is connected to the line circuit 64 through wire 14. The contact 13 carried by lever 10 coöperates with a fixed contact 15, while in the peculiar slot 12, is engaged the end of a stem 16, which is connected to a valve 17, arranged to vent fluid under pressure from the brake pipe 19 through the branch pipe 18. The peculiarity of the slot 12 in head 11 is that for a portion of its length it remains curved on an arc concentric with its pivot so that while rocking from "off" toward "on" position it will retain the stem 16 locked therein, while for the remaining portion of its length said slot is so shaped as to thereafter release said stem. The stem 16 is retained in locking engagement with the head 11 until the circuit connection between contacts 13, 15, is completed. Fluid vented from the train pipe 19 by operation of the valve 17 may be employed to actuate a signal device 20 which in this instance is a whistle.

Associated in the circuit which the master switch controls is the motorman's brake valve B', by which a service application of the brakes may be effected in the ordinary and usual way, but which also may be manipulated to control an emergency application of the brakes or the supply of additional pressure to the brake mechanism to make a quick stop of the car or train in case of emergency exigency. The motorman's brake valve B' includes an operating handle 21, which controls contacts 22 and 23 arranged respectively in the pneumatic service and emergency application positions of the brake valve so that in said positions current will be supplied from the contact 15 through wire 111 and the handle 21 to said contacts.

The stem 16 has a portion 24 which forms the core of a solenoid 25, the coils of which are in a branch of the circuit controlled by the contacts 13 and 15, which branch is grounded as at 26. Also connected to move with stem 16, is the bridging contact strip 28, coöperating with contacts 31, 32. These contacts, when bridged, serve to complete a circuit adapted to be supplied with current from the car motor whereby to utilize the current generated thereby when operating as a generator, to effect either a service or an emergency application of the brakes. The motor is indicated at M, and when operating in the normal manner as the running motor of the train, it receives current from the trolley, third rail or other source 64 in the usual manner as indicated at 33, the same being controlled by an ordinary reversing switch indicated generally by reference letter K, the function of which when actuated is to reverse the motor connections, in case the supply or line current should fail, thereby enabling the motor to run as a generator. The reversing switch K, may be controlled in any suitable way, as, for instance, by a magnet L, arranged and operating to hold the reversing switch K in position to maintain proper circuit connections to supply the motor with current. But should the line current fail for any reason, the reversing switch operating magnet L is deënergized, thereby reversing the motor connections and enabling the same to operate as a generator. The current thus generated is supplied from the local closed generator circuit through conductor 110, magnet 34, lead 29, to contact 32 and thence through switch bar 28 to contact 31 and lead 30, which contains the device E', back to the local generator circuit, as will presently be more fully explained.

Included in the circuit which is controlled by the master switch A' and the motorman's brake valve B', and also in the circuit supplied by the motor when acting as a generator, is a device indicated generally by reference sign O, which in this instance, is in the form of a solenoid 34, the function of which is to control the service release of the brake mechanism, thus establishing an interlock relation between the electro-pneumatic control system and the regular service control which prevents a release of the brakes, when once applied in emergency application, by any manipulation on the part of the motorman of the motorman's service control. In the accomplishment of these functions the solenoid 34, controls a bridging strip 35 which coöperates with contacts 36, 37, the arrangement being such that the energization of the solenoid 34, which takes place when the electro-pneumatic application of the brakes is effected, will cause the service release device R' to be closed, current being supplied to the magnet 34 from supply wire 14 through contacts 13 and 15, wire 111, either the contact 22 or 23, according to the position of the brake valve handle 21, to wire 115, thence through magnet 34 and wire 110 to ground wire 117. The wire 114 being grounded through the contacts 36 and 37, current is also supplied to release magnet 113 from wire 112. When the line current fails, the reverse switch operates to change the connections of the car motor M, so that the same operates as a generator in a closed circuit and as the failure of line current also causes the deënergization of magnet 25, the contact strip 28 bridges the contacts 31 and 32 so that a circuit is closed through the emergency magnet E' as follows; from the closed generator circuit through wire 30, contact 31, bridging strip 28, contact 32, wire 29, magnet 34, and wire 110. The magnet 34 being energized by current from the motor M acting as a generator, the bridging strip 35 is actuated to open the release magnet circuit through the contacts 36 and 37, so that the release magnet R' is deënergized and the electric release valve thus closed to prevent exhaust of fluid from the brake cylinder, thereby preserving the emergency application of the brakes by preventing the service release of the brakes.

Having now described my invention, what I claim as new and desire to secure by Letters Patent, is:

1. In an electro-pneumatic brake, the combination with means for controlling the brakes electrically, of a master switch for controlling the current for said means, a valve for effecting an application of the brakes, and means for mechanically locking said valve against movement in one position of the switch.

2. In an electro-pneumatic brake, the combination with a master switch for controlling the electric brake circuits, and having an off position, of a valve associated with said switch for effecting a reduction in brake pipe pressure and an application of the brakes and mechanically locking means adapted upon the movement of the switch to off position for preventing movement of said valve.

3. In an electro-penumatic brake, the combination with a master controller having one position for supplying current to the brake circuits and another position in which the circuits are open, of a valve for venting fluid from the train pipe to effect an application of the brakes, a magnet for normally holding said valve closed when energized and adapted upon deënergization to permit the valve to open, and a mechanical connection between the master switch and the valve for preventing the opening of the valve in the open position of the switch when the magnet is deënergized.

4. In an electro-pneumatic brake, the combination with a master switch having a switch handle provided with an open and a closed position, of a valve for controlling the venting of fluid from the train pipe to effect an application of the brakes, a magnet, the core of which forms the operating stem of the valve, and a slot in said handle for guiding the valve stem and adapted to prevent movement of the valve stem when the switch handle is in its open position, while permitting movement of the stem when the switch is in its closed position.

5. In an electro-pneumatic brake, the combination with a master switch having an open and a closed position, of a car motor adapted to be connected to operate as a generator for supplying current to effect an application of the brakes, a switch for controlling the generator circuit, means associated with the master switch for controlling the operation of the generator circuit switch and adapted in the open position of the master switch to prevent operation of the generator circuit switch.

6. In an electro-pneumatic brake, the combination with a master switch comprising a handle for controlling electric brake circuits and having an off and an on position, of a switch for controlling the circuit of the car motor acting as a generator, a valve adapted for venting fluid from the train pipe to effect an application of the brakes, a magnet, a stem for operating said switch and valve and constituting the solenoid core of the magnet, and a slot in said handle for engaging said stem having a portion of its length shaped to permit free movement of the stem and another portion shaped to prevent movement of the stem.

7. In an electro-pneumatic brake, the combination with a master switch for controlling electric brake circuits comprising a switch handle having an open and a closed position, of a device associated with the master switch for effecting an application of the brakes upon failure of line current, a stem for operating said device having a crosshead, and a slot in said switch lever for containing said crosshead and adapted in the open position of the handle to lock the crosshead against movement.

In testimony whereof I have hereunto set my hand.

JAMES S. DOYLE.

Witnesses:
W. G. STRAIT,
F. G. JOHNSON.

Copies of this patent may be obtained for five cents each, by addressing the "Commissioner of Patents, Washington, D. C."